(12) United States Patent
Bausov et al.

(10) Patent No.: US 8,847,813 B2
(45) Date of Patent: Sep. 30, 2014

(54) UNSYNCHRONIZED RADIO IMAGING

(75) Inventors: Igor Bausov, Raton, NM (US); Gerald Stolarczyk, Raton, NM (US); Larry G. Stolarczyk, Raton, NM (US); Tito Sanchez, Raton, NM (US); Joseph Duncan, Raton, NM (US)

(73) Assignee: Stolar Research Corporation, Rio Rancho, NM (US)

( * ) Notice: Subject to any disclaimer, the term of this patent is extended or adjusted under 35 U.S.C. 154(b) by 473 days.

(21) Appl. No.: 13/301,762

(22) Filed: Nov. 21, 2011

(65) Prior Publication Data

US 2012/0062408 A1 Mar. 15, 2012

Related U.S. Application Data

(63) Continuation-in-part of application No. 12/815,420, filed on Jun. 15, 2010, now Pat. No. 8,063,814.

(51) Int. Cl.
*G01S 13/88* (2006.01)
*G01S 13/00* (2006.01)
*G01V 3/12* (2006.01)

(52) U.S. Cl.
CPC .............. *G01S 13/003* (2013.01); *G01V 3/12* (2013.01)
USPC ............................................. 342/22; 342/179

(58) Field of Classification Search
CPC ..... G01S 13/885; G01S 13/003; G01S 13/34; G01V 3/12; G01V 3/30; G01N 33/24
USPC ................................................ 342/22, 27, 179
See application file for complete search history.

(56) References Cited

U.S. PATENT DOCUMENTS

| | | | | |
|---|---|---|---|---|
| 4,577,153 | A * | 3/1986 | Stolarczyk | 324/334 |
| 8,063,814 | B1 * | 11/2011 | Bausov et al. | 342/22 |
| 2003/0132751 | A1 * | 7/2003 | Stolarczyk | 324/334 |
| 2008/0218400 | A1 * | 9/2008 | Stolarczyk et al. | 342/22 |
| 2011/0304495 | A1 * | 12/2011 | Bausov et al. | 342/22 |
| 2012/0062408 | A1 * | 3/2012 | Bausov et al. | 342/22 |

\* cited by examiner

*Primary Examiner* — John B Sotomayor
(74) *Attorney, Agent, or Firm* — Richard B. Main; Main Law Firm

(57) ABSTRACT

An unsynchronized acoustic or radio-frequency (RF) computed tomography (CT) imaging system with matched, but independent, continuous wave (CW) transmitters and receivers configured to radiate acoustic or RF transmissions in a plurality of vector paths through solid geologic material. A computer calculates and displays tomographic images constructed from individual acoustic or RF path signal travel time or attenuation measurements logged from registered locations from the CW transmitters and receivers after their being shuttled amongst a number of different transmitter and receiver perspectives available around said geologic material to generate data necessary for computed tomography. Each of the transmitters and receivers include independent unsynchronized crystal oscillators rated at 10-ppm or better frequency uncertainty to produce and to detect CW radio frequency (RF) transmissions.

7 Claims, 2 Drawing Sheets

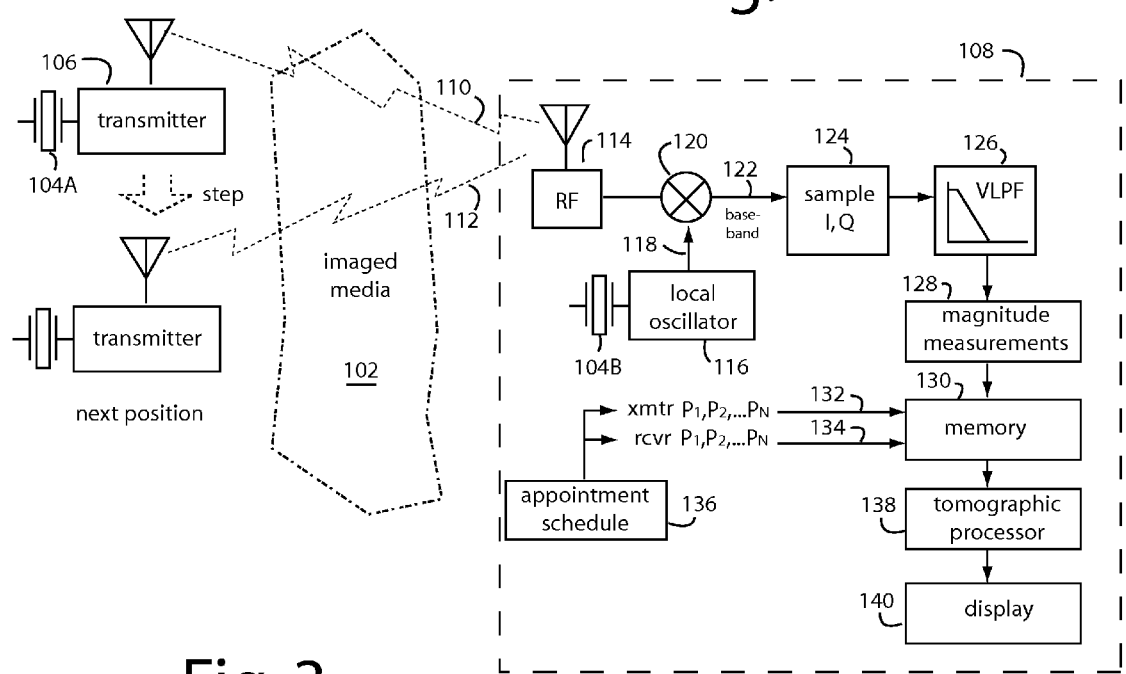
Fig. 1
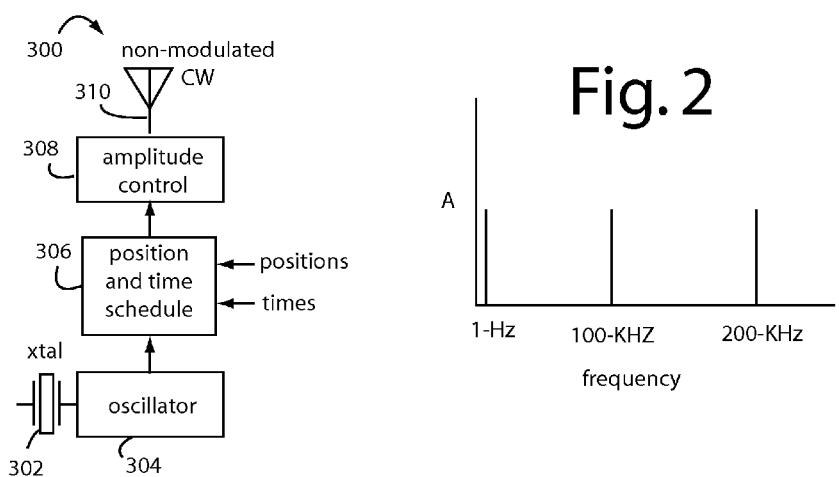
Fig. 3
Fig. 2

UNSYNCHRONIZED RADIO IMAGING

COPENDING APPLICATION

This Application is a continuation-in-part of U.S. patent application Ser. No. 12/815,420, filed Jun. 15, 2011, and titled, BEAT-PRODUCT RADIO IMAGING METHOD (RIM), and which will issue as U.S. Pat. No. 8,063,814, on Nov. 22, 2011.

FIELD OF THE INVENTION

The present invention relates to ground-penetrating radars and coal mining, and more particularly to methods and systems for discovering and characterizing geologic anomalies in coal bed deposits with unsynchronized radio-imaging transmitters and receivers.

DESCRIPTION OF THE PRIOR ART

There is a growing need to produce cleaner run-of-mine (ROM) coal, and to improve safety. The identification of anomalies is important so planning operations keep productivity high and cleaner coal can be safely cut. Being able locate and "see" paleochannels before any mining actually started allows longwall panels to be laid out to accommodate otherwise hidden anomalies.

Stolar, Inc. (Raton, N. Mex.) has developed several generations of highly sophisticated radar imaging method (RIM) equipment that can produce tomographic images of coal seams. A natural coal seam waveguide occurs in layered sedimentary geology because the electrical conductivity of the bounding shale, mudstone, and fire clay, ranges between 0.01 and 0.1 Siemens per meter (S/m) (100 and 10 ohm-meters). Inside, the conductivity of the coal is near 0.0005 S/m (2,000 ohm-meters). The 10:1 conductivity contrast enables the waveguide travel of electromagnetic waves within the coal bed.

The electric field ($E_z$) component of a traveling electromagnetic wave (EM) is polarized in a vertical direction and the magnetic field ($H_y$) component is polarized horizontally in the seam. The energy in this part of the EM wave travels in the coal seam from the transmitter to the radio imaging receiver. There is a horizontally polarized electric field ($E_x$) that has zero value in the center of the seam and reaches maximum value at the sedimentary rock-coal interface. This component is responsible for transmission of the electromagnetic wave signal into the boundary rock layer. The energy in this part of the EM wave travels vertically in the coal deposit.

The magnitude of coal seam radiowave decreases as it travels along the waveguide. The attenuation rate and cylindrical spreading of wave energy in the coal seam are two of the things at work that attenuate the traveling signals. The cylindrical spreading factor is $$\frac{1}{\sqrt{r}},$$

where r is the distance from the transmitting to receiving antenna. This factor compares with the non-waveguide far-field spherically spreading factor of 1/r.

Thus, for a given separation of one-hundred meters, the magnitude of the seam EM wave decreases by ten in a waveguide, and by a factor of one-hundred in an unbounded media. So one advantage of sending signals down a seam waveguide is the much greater travel distance. Another advantage is that the traveling electromagnetic wave predominantly stays within the coal seam, the main item of interest.

A coal-seam electromagnetic wave is very sensitive to changes in the waveguide geometry and materials. The radio-wave attenuation rate (decibels per 100 feet) and phase shift (electrical degrees per 100 feet) were determined by Dr. David Hill at the National Institute for Science and Technology (NIST). Dr. James Wait recognize that natural waveguides exist in the earth's crust. The science underlying the traveling of an electromagnetic wave in the coal seam waveguide is well known. The engineering of both the cross-hole transmitter and receiver has also been developed to a high degree of performance. The transmitter and receiver are synchronized to enable the measurement of total path phase shift from the transmitter to the receiver location.

In uniform-construction waveguides, the path is a straight line. The path length or distance a radio signal travels can be determined from signal measurements. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. This bending cannot be accounted for in ART processing and accounts for this distortion in the ART tomography processing algorithm. The bending effect can be accounted for in tomography reconstruction used to build three-dimensional images of anomalous geology. The effect of attenuation in the waveguide is to reduce the magnitude of the electromagnetic wave along the path.

Under sandstone sedimentary rock, the attenuation rate increases because more of the radio imaging signal travels vertically into the boundary rock, e.g., leaks from the waveguide. If water is injected into the coal, then clay in the coal causes the electrical conductivity to decrease and the attenuation rate/phase shift to increase.

The attenuation rate/phase shift rapidly increases with decreasing seam height. Thus coal seam thinning can be easily detected with radio imaging. The above graphical presentation of coal seam waveguide attenuation and phase constants represents the science factor in the art and science of interpreting radio imaging tomographic images. Higher attenuation rate zones suggest that either the coal seam boundary rock is changing, the seam is rapidly thinning, or/and water has been injected into the coal seam. Drilling and radar would determine the exact cause of the anomalous seam condition. This advance in the state of the art in mining would reduce both risk and cost in coal extraction.

Faults and dykes cause reflections to occur in the waveguide. The reflections can appear as excess path loss. Total phase shift measurements are useful in detecting reflection anomalies.

The predominating electromagnetic wave propagation mode in layers of coal is a "seam wave". Such is polarized in the vertical plane of the seam, and has a uniform, polarized electric field orthogonal to the layer. In horizontal lying coal bed layers, the magnetic field will be horizontally polarized with the same field strength across a vertical cross-section. The electric field is vertically polarized. A third electric field is polarized in the horizontal plane and is maximum value at each boundary of the seam.

The horizontal component of the electric field is null near the physical center of the coal seam, albeit if the lower-resistivity boundary layers above and below are about equal in their respective material electrical resistivity.

In underground coal mining practice, horizontal magnetic dipole antennas can be driven by a radio transmitter so a seam wave will propagate within the coal, or other layer of higher-resistivity media. A remote, horizontal magnetic dipole receiving antenna is then used to measure the seam wave with a receiver synchronized to the transmitter.

Conventional RIM type systems typically use fiber-optic cables for the receiver-transmitter synchronization because a metallic cables would interfere with reception by receiving the transmitted signals, and re-radiating them to compete with the direct signal to the receiver. Phase coherent receivers used synchronous detection and accurate phase measurements of the direct signal to ascertain the nature of the coal seam between. The effects on direct signal phase help elicit the nature of the coal layer, given a priori or concomitant material dielectric-constant measurements.

However, the logistics of providing a synchronization channel, cable, or fiber is impossible in many mines and in particular applications. Therefore, a system and method is needed that does not depend on synchronizing the transmitters and receivers to one another.

The present inventors have been developing a Deep Look ground penetrating radar that has detected tunnels twenty feet deep by transmitting a double sideband radio wave. The technology uses a heterodyne process to create sum and difference frequencies. The heterodyne is created by transmitting the two phase coherent frequencies through a square law devices. The process allows early arrival time signals to be suppressed while passing through late arriving signals.

In coal mining, such technology enables the suppression of reflected waves from a first materials interface, e.g., to better detect abandon mine entries ahead of mining.

Heterodynes of two different frequency, coherent, acoustic or seismic signals will occur in stress fields like those surrounding tunnels and their entries. A transmitting source with a separation distance to a receiver is moved along an interface. An object of interest is in the natural media on the far side of such interface.

The wave transmission paths may be an ensemble of the refraction paths of a pair of signals between the surface receiver and transmitter. The travel and arrival times depend on the refraction path length. Some signals will arrive earlier and some later. The earlier arrival signals can be suppressed to eliminate surface effects. The later arrival signals that traveled through non-linear stress fields will include heterodynes and be detectable as the sum or difference frequency. Such are the largest magnitude signals when the non-linear function is square law. If the non-linearity is more than square law, the heterodyne products increase. Measurements of the product magnitudes can be used to reconstruct the non-linear function.

Beyond the detection of mine voids, shallow buried small diameter bore holes and tunnels can be detected better by being able to easily suppress the usual surface clutter. The depth to the objects of interest can be gauged by varying the separation frequency of the two-frequency transmissions.

The coherency in the process allows each of the frequency signals to be represented by phasors each at the heterodyne frequency (like a sum product). The suppression process is a gradiometric where the early arriving signals are removed by subtracting early time phasors. The later arrivals exhibit minimum to maximum values when phase changes by ninety degrees. The frequency range for a ninety degree change determines the distance to the objects of interest.

SUMMARY OF THE INVENTION

Briefly, an unsynchronized radio imaging system embodiment of the present invention uses matched, but independent, continuous wave (CW) transmitters and receivers to electronically image solid geologic material in the paths between the transmitters and their respective receivers strategically placed in tunnels, wells, and boreholes. Tomographic images are constructed from individual path signal attenuation measurements that can be logged at registered locations from a number of different transmitter and receiver perspectives available around the geologic materials of interest. The transmitters and receivers each have crystal oscillators rated at 10-ppm or better frequency uncertainty. Each receiver's crystal oscillator is used as a local oscillator to beat down the associated transmitter's carrier frequency to baseband. The frequency error between the local oscillator and the transmitter carrier frequencies produces a beat product of less than one Hertz in frequency and its magnitude is inversely proportional to the path attenuation between the transmitter and receiver. An extremely low-pass filter is used to remove all the heterodyne above one Hertz in the detector and thus achieves the extraordinarily high sensitivity needed in highly attenuating depths and distances usual to these applications.

These and other objects and advantages of the present invention will no doubt become obvious to those of ordinary skill in the art after having read the following detailed description of the preferred SPS receivers which are illustrated in the various drawing figures.

IN THE DRAWINGS

FIG. 1 is a functional block diagram showing a system embodiment of the present invention;

FIG. 2 is a chart of the amplitude (A) versus the frequency spectrum of signals representing the sum and difference heterodynes, and the original inputs that appear in the frequency domain at the output of the mixer in FIG. 1;

FIG. 3 is a functional block diagram of a beat product RIM transmitter embodiment of the present invention.

DETAILED DESCRIPTION OF THE PREFERRED EMBODIMENT

Figure 4:
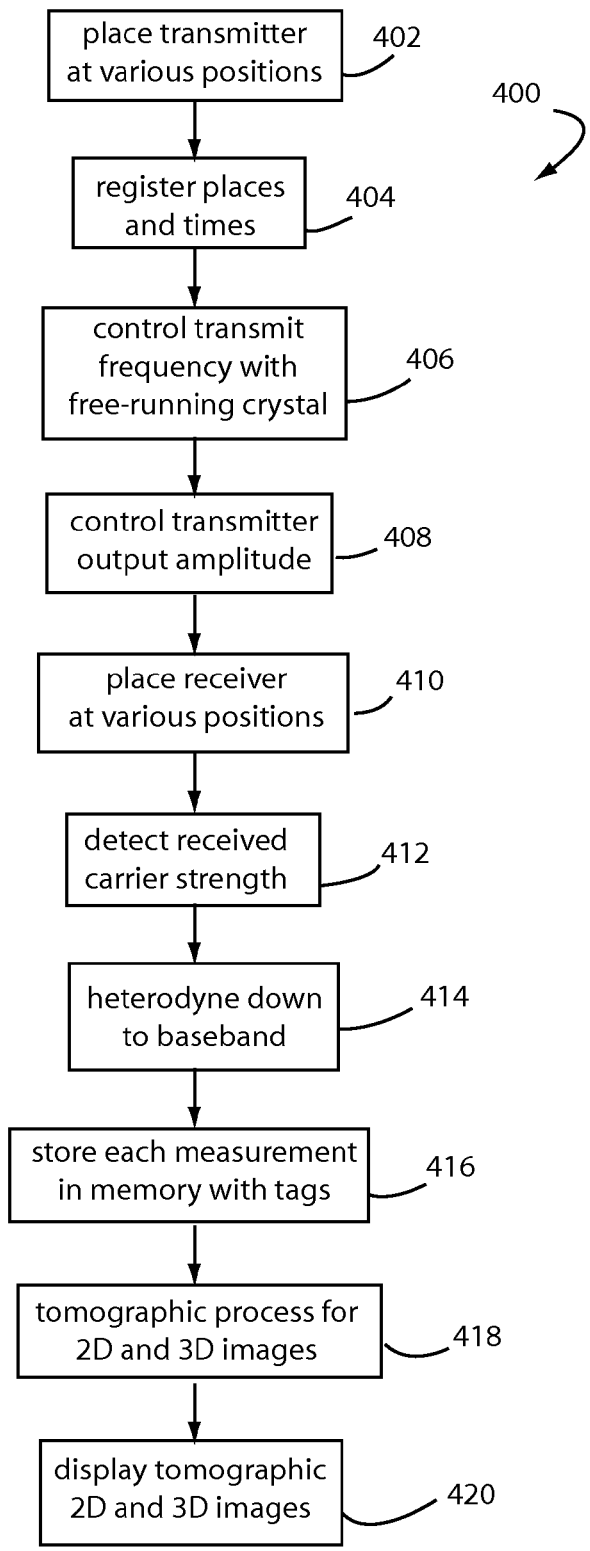
FIG. 4 is a flowchart diagram of a method embodiment of the present invention.

Extraordinarily high receiver sensitivity is needed in RIM coal seam surveys because the radio signals are so highly attenuated by the earth and soils. The limits of receiver sensitivity are reached when the signal-to-noise ratio (SNR) drops too low. Transistor noise in the radio frequency preamplifier is another limiting factor that has been partially overcome with low-noise amplifiers (LNA's). Code division multiple access (CDMA) modulation techniques, such as used in GPS navigation receivers and cell phones, allows correlation processing gains to pull signals out that were otherwise too deeply buried in noise.

Embodiments of the present invention use the beat products of a transmitter's and a receiver's crystal reference oscillators to pull in the signal of interest that would otherwise be buried in too much noise. The signal detection is simple and continuous, and only the amplitude of the CW carrier wave received from the transmitter is the information to be extracted. The receiver is "tuned in" when a mixer after a local oscillator produces rolling-phase outputs under one Hertz in frequency. A synchronous receiver is not necessary.

Epson Toyocom markets their TSX-3225 as a 16-MHz crystal with a frequency tolerance of ±10 ppm and a frequency stability of ±10 ppm over an operating temperature range of −20° C. to +75° C. If the 16-MHz were divided by one hundred and sixty down to 100-KHz, then the frequency stability would be at least than one Hertz. Two such crystals beat together after dividing down to 100-KHz would produce beat products of 200-KHz, 100-KHz, and 0-Hz, all ±1-Hz. A low pass filter with a knee just around 1-Hz could easily screen out the higher frequencies and background noise.

FIG. 1 represents unsynchronized radio-frequency (RF) computed tomography (CT) imaging system 100 for radio imaging a coal-seam or other geologic media 102. A pair of high quality crystals 104A and 104B each have a frequency tolerance of ±10-ppm and a frequency stability of ±10-ppm over an operating temperature range of −20° C. to +75° C. One such crystal, 104A, is disposed in a RIM transmitter 106, the other crystal, 104B, is disposed in a RIM receiver 108.

In a first position on one side of geologic media 102, RIM transmitter 106 sends out a continuous wave (CW) radio frequency (RF) transmission signal 110. Such will be more or less characteristically attenuated by the material that lies along the path between where RIM transmitter 106 is and where the RIM receiver 108 is on the other side of geologic media 102.

In a second position on the same side of geologic media 102, RIM transmitter 106 sends out another CW RF transmission signal 112. Such too will be more or less characteristically attenuated by the adjacent material that lies along the path between where RIM transmitter 106 is now and where RIM receiver 108 still is. A number of attenuation measurements are collected from dozens or hundreds of various locations for the RIM transmitter 106 and RIM receiver 108, enough so a tomographic 2D or 3D image can be constructed of the geologic media 102.

The received CW RF signal 110 can be expected to be very faint, so it needs to be amplified by an RF amplifier 114 which includes an automatic gain controller configured to normalize said individual path signal attenuation measurements such that variations in operating conditions, equipment, and components, do not render as artifacts in tomographic computations and displays.

A local oscillator (LO) 116 produces an LO-signal 118 from crystal 104B that is at the carrier frequency of the received CW RF signals 110 and 112. These are multiplied in a mixer 120. FIG. 2 represents the resulting heterodynes, the sum, difference, and original inputs which appear in the frequency domain at the output of mixer 122. The difference heterodyne output signal will be below one Hertz, and any noise energy will be well above one Hertz.

Since the reference signals produced from crystals 104A and 104B are not synchronized, a mixer output signal 122 representing the difference in input signals will roll around in phase. But because any reference signals produced from crystals 104A and 104B have a frequency tolerance of ±10-ppm and a frequency stability of ±10-ppm over their operating temperature range, the mixer output signal 122 representing the difference in input signals will not exceed one Hertz when the carrier frequencies are on the order of 100-KHz. The inphase (I) and quadrature phase (Q) components of the mixer output signal 122 are sampled for digital signal processing. The vector sum of these I and Q components represent the magnitude of the received signals 110 and 112.

The channel and receiver noise will be much higher in frequency than the signal-of-interest, and are screened out entirely by a very low pass filter (VLPF) 126. Linear processing only is used, conventional non-linear processing multiplies the noise along with the signal and the advantages of the present invention will be lost. A linear transform of the coordinates is preferred, a Fourier transform with 256-points can be computed as well. A frequency domain power spectrum is produced that allows the signal and noise energies to be easily separated. The useful signal is monochromatic.

A measurement device 128 measures the magnitude of signal 110 and forwards them to a memory 130 for storage with the time and the transmitter x, y, z positions $(P_1, P_2, \ldots P_N)$ 132 and the receiver x, y, z positions $(P_1, P_2, \ldots P_N)$ 134.

The x, y, z positions $(P_1, P_2, \ldots P_N)$ of the transmitter and receiver can be automatically obtained and entered by optical or wireless readers of marker plaques and stations, GPS navigation receivers, visitation appointment schedules, or manually, both before and after the actual measurement is obtained. The x, y, z positions $(P_1, P_2, \ldots P_N)$ of the transmitter and receiver can also be taken from an appointment schedule.

A tomographic processor 138 calculates two dimensional (2D) and three dimensional electronic images of media 102 from the many measurements and corresponding transmitter and receiver positions stored in memory 130. A user display 140 can provide real-time guidance for machinery, or important data for planning and safety.

FIG. 3 represents a beat-product RIM transmitter 300 that could be used in the system shown in FIG. 1. The beat-product RIM transmitter 300 includes a high quality crystal 302 connected to an oscillator 304. Frequency synthesizer techniques can be used to produce a higher or lower frequency than that of crystal 302 and a frequency tolerance of ±10-ppm and a frequency stability of ±10-ppm or better over the operating temperature range. The beat-product RIM transmitter 300 is matched to a beat-product RIM receiver that has an unsynchronized local oscillator that also has a frequency tolerance of ±10-ppm and a frequency stability of ±10-ppm or better over the operating temperature range. Embodiments of the present invention depend on this match because synchronization of the receiver to the transmitter is not practical in the intended applications underground.

The times and places visited by the beat-product RIM transmitter 300 are important to know in batch processing that will follow later to render tomographic images. The times and places that the beat-product RIM transmitter 300 was at when it transmitted its signals can be collected as they occur in real-time, or they can be scheduled and delivered according to a schedule 306.

The transmitted CW output magnitude of the beat-product RIM transmitter 300 must either be constant or calibrated so a matching beat-product RIM receiver can collect meaningful measurements of the signal attenuation imposed by the intervening geologic media. An amplitude control 308 provides this function. An antenna 310 is used to radiate the CW signal, and will typically comprise a magnetic dipole for operation at about 100-KHz.

FIG. 4 represents a radio imaging method (RIM) embodiment of the present invention, and is referred to herein by the general reference numeral 400. Such method may be executed as a computer program in a software defined radio platform. RIM 400 begins with a step 402 by placing a continuous wave (CW) radio frequency (RF) radio transmitter with a carrier amplitude (A) at various predetermined places $(P_1, P_2, \ldots P_N)$ along the fringes of a mass at corresponding known times $(t_1, t_2, \ldots t_N)$. A step 404 registers the predetermined places $(P_1, P_2, \ldots P_N)$ and corresponding known times $(t_1, t_2, \ldots t_N)$ in a computer data memory. A step 406 controls the frequency of the CW RF radio transmitter with a first free-running crystal oscillator that has a frequency uncertainty determined to be better than ten parts per million (10-ppm). A step 408 controls the output amplitude of steady-state radio transmissions from the CW RF radio transmitter. A step 410 places a continuous wave (CW) radio frequency (RF) radio receiver to measure a series of carrier amplitudes ($A_1$, $A_2$, ... $A_N$) at the various predetermined places ($P_1$, $P_2$, ... $P_N$) along the fringes of the mass at the corresponding known times ($t_1$, $t_2$, ... $t_N$).

A step 412 detects the strength of each of the carrier amplitudes ($A_1$, $A_2$, ... $A_N$) by mixing with a local oscillator frequency obtained from a second free-running crystal oscillator having a frequency uncertainty also determined to be better than ten parts per million (10-ppm). A step 414 mixes a received RF CW signal transmission from the radio transmitter, and down-converting to baseband such that a rolling-phase heterodyne results that has a vector magnitude proportional to the attenuating effects of the intervening mass and a frequency of less than one Hertz, wherein the first and second free-running crystal oscillators are not synchronized to any other signals or references, nor each other. A step 416 stores each measurement of the vector magnitude in a computer data memory and tags them with the respective predetermined places ($P_1$, $P_2$, ... $P_N$) corresponding to particular measurements. A step 418 tomographically processes a plurality of measurements stored in the computer data memory to obtain an image of the internal characteristics of the materials in the mass. A step 420 displays these images to a user for real-time control of machinery or operational planning.

In general, each receiver cannot be synchronized with the transmitters because it is not practical to string fiberoptic cable between them around a 10,000×1500 foot block of coal. The transmitters however being on the same side, can be synchronized by their sharing of a common crystal oscillator clock over a relatively short connection. A lower frequency transmit signal, e.g., a 80-kHz pilot, is generated to be phase coherent with a higher frequency signal in the medium frequency (MF) radio band.

A problem occurs because the receiver is unsynchronized with the transmitters' clock. Indirect synchronization can be derived by sending a pilot, e.g., a lower frequency signal that will experience a much lower attenuation rate and stand a better chance at being detected. The received pilot is used to synthesize a sync.

The attenuation rate and phase shift increases with the first power of frequency. The arriving pilot signals are much larger in magnitude than those of the higher frequency signals, but still phase coherent with the lower frequency signal. Both signals are mixed down to within a one hertz beat frequency bandwidth.

The heterodyne signal may not initially be phase coherent with the arriving high frequency signal. Heterodyne signals used in mixing down the high frequency signal to within the one Hertz bandwidth are made phase coherent with a phase locked loop. It maximizes the beat frequency signal magnitude in the one Hertz bandwidth. The microprocessor that controls the phase of the high frequency heterodyne phase locked loop automatically varies phase until the beat frequency signal is maximized. The beat frequency signal is sent to a quadrature detector which itself is synchronized with the receiver clock. The quadrature detector separates the one Hertz bandwidth signal into in-phase and imaginary quadrature components. The magnitude and phase shift data is recovered for processing in a three dimensional full waveform tomography reconstruction algorithm.

Since the high frequency signal transmission path attenuation and phase shift rates increase by the ratio of the high to low frequencies, the rates correspondingly become higher, creating a much higher resolution image that also corrects for refraction artifacts. For example, the low frequency signal can be set to 80-kHz, and the higher one set to 800-kHz, for a ratio of ten to one. An advantage of such automatic synchronization is that the detection bandwidth can be reduced to one Hertz. With a noise figure of unity, the receiver detection sensitivity for a 10-dB S/N ratio approaches a theoretical sensitivity value of −168 dBm below one milliwatt in 50-ohms.

The detection process can be allied in the detection of non-linear stress fields in natural subsurface media. Non-linear stress fields are created when tunnels/bore holes are drilled or developed in natural media. When two different frequency seismic or acoustic signal components are directed through non-linear stress fields, the components will heterodyne to produce sum and difference beat frequency signatures that can be detected.

In general, there are Nf1 plus and minus Mf2 products with magnitudes that depend on the coefficients of a power series expansion of the non-linear stress field. If the expansion is predominately square law, the sum and difference beat products predominate. Natural media heterodynes around voids and fractures in rock, the heterodynes can be detected, interpreted, and imaged as important features.

Of particular interest, holes bored to run plastic pipe and tunnels cutting across international boarders can be readily detected by embodiments of the natural media heterodyne methods described herein. In geothermal reservoir rock, the physical-chemical reactions in the reservoir rock pore spaces are affected by stress fields that alter flow permeability, and such can be revealed with the acoustic heterodyne method.

The heterodyne beat products formed in natural media can each be re-heterodyned by the receiver down conversion process to create measurable signals within a one Hertz bandwidth where receiver synchronization can be achieved with seismic or an acoustic two-frequency signal generators (sources). If the seismic or acoustic signal generator produces a spectrum instead of predominately single frequency components, a sample of each spectrum can be acquired from the source and cross correlated with the media heterodyne signal for autocorrelation and optimum detection sensitivity for non-linear stress fields in natural media.

The advantage of two-frequency transmission and correlation signal processing is that noise and clutter are easily suppressed. Such noise and clutter are a common problem in conventional ground prenatrating anomaly detection systems.

Each pair of received frequency components are heterodyned, down-difference or up-sum converted, to the identical Intermediate Frequency. Each frequency component can be represented by a Phasor vector whose length represents the magnitude of received frequency component. Each Phasor is 180 degree phase shifted from the other in the receiver heterodyne process and gradiometrically subtracted to minimize the magnitude of the IF signal.

The attenuation rate and phase shift loss tangent greater than unity depends on the first power of frequency. The magnitude and phase shift of each received frequency component will be different. The minimization of the magnitude of the IF signal by varing the phase of the heterodyning signal minimizes the magnitude of the IF signal by subtracting (suppressing) the early arriving clutter signals. The remaining media heterodyne beat products or the receiver mixer down conversion products are applied to the analog to digital converter. Thus enabling the full range of converter to digitize the change in the path electrical conductivity and its effect on attenuation and phase or in the case of acoustic waves, the detection and measurement of non linear stress fields. The measurement applies phase coherent quadrature detection (auto correlation) process.

The gradiometer subtraction occurring in the down conversion process enables IF phasors suppression enabling better automatic gain control. This enables the full dynamic range digitization of the heterodyne signals of interest. The processed data enables full waveform three dimensional tomography reconstruction of geologic anomalies where refraction occurs along transmission paths. Refraction distortion creases artifacts in image reconstruction, which has been a significant problem in imaging mineralized zones in ore bodies and anomalies in the coal seam waveguide.

Although the present invention has been described in terms of the presently preferred double sideband transmission and reception system, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. An unsynchronized computed tomography (CT) imaging system, comprising:
    at least one pair of matched, but independent, continuous wave (CW) transmitters and receivers configured to radiate CW transmissions in a plurality of vector paths through solid geologic material with strategic known transmission and reception points in tunnels, wells, surfaces and/or boreholes;
    a computer configured to calculate and display tomographic images constructed from individual path travel times and signal attenuation measurements logged from registered locations from the CW transmitters and receivers having different transmitter and receiver perspectives around said geologic material necessary for computed tomography; and
    a device configured to normalize said individual path travel time or signal attenuation measurements such that variations in operating conditions, equipment, and components, do not render as false image artifacts in tomographic computations and displays;
    wherein, each of the CW transmitters and receivers include independent unsynchronized crystal oscillators rated at 10-ppm or better frequency uncertainty to produce and to detect CW transmissions.

2. The unsynchronized CT imaging system of claim 1, further comprising:
    a local oscillator connected to said receiver's crystal oscillator and configured to heterodyne with the carrier frequency of the transmitter in the CW transmissions to produce a baseband signal during detection;
    wherein, any frequency error between the local oscillator and the transmitter carrier frequencies in the baseband signal is limited to a beat product of less than one Hertz in frequency and its magnitude is inversely proportional to the attenuation in a path between the transmitter and receiver.

3. The unsynchronized CT imaging system of claim 2, further comprising:
    an extremely low-pass filter configured to remove all heterodyne products above one Hertz in a detector;
    wherein an extraordinarily high sensitivity results in imaging.

4. The unsynchronized CT imaging system of claim 1, further comprising:
    a matched continuous wave (CW) transmitter and receiver for electronically imaging material in between them, wherein signal travel time or attenuation measurements are collected from a number of different transmitter and receiver perspectives around the material;
    a pair of crystal oscillators, one of which is disposed in the transmitter and the other of which is disposed in the receiver, and each crystal oscillator having the same rating for frequency uncertainty better than ten parts per million (10-ppm); and
    a local oscillator disposed in the receiver that uses a reference frequency obtained from the receiver one of the pair of crystal oscillators, and configured to produce a local oscillator signal that can mix the transmitter's carrier frequency to baseband;
    wherein, the frequency error between the local oscillator and the transmitter carrier frequencies produces a beat product of less than one Hertz in frequency and its magnitude is inversely proportional to the path attenuation between the transmitter and receiver; and
    wherein, a low-pass filter is used to remove everything above one Hertz in the detector to produce an output signal for tomographic processing and display of the material characteristics.

5. The unsynchronized CT imaging system of claim 1, further comprising:
    an amplitude control device to normalize the amplitude of steady-state radio frequency transmissions output by the CW transmitter.

6. The unsynchronized CT imaging system of claim 1, further comprising:
    a computer data memory for registering a series of predetermined places ($P_1, P_2, \ldots P_N$) occupiable by each of the CW transmitter and receiver on the perimeters of a mass at corresponding known times ($t_1, t_2, \ldots t_N$), and for correlating a series of amplitude measurements ($A_1, A_2, \ldots A_N$) taken by the CW receiver at those places and times.

7. The unsynchronized CT imaging system of claim 1, further comprising:
    a tomographic processor to construct electronic image representations of the internal character of the materials in said mass from information stored in the computer data memory.

* * * * *